United States Patent

Schwarz, Jr.

[11] Patent Number: 5,242,489
[45] Date of Patent: Sep. 7, 1993

[54] INK JET PRINTING PROCESSES

[75] Inventor: William M. Schwarz, Jr., Webster, N.Y.

[73] Assignee: Xerox Corporation, Stamford, Conn.

[21] Appl. No.: 983,939

[22] Filed: Dec. 1, 1992

Related U.S. Application Data

[62] Division of Ser. No. 738,021, Jul. 30, 1991, Pat. No. 5,207,825.

[51] Int. Cl.$^5$ .................... G01D 9/06; C09D 11/02
[52] U.S. Cl. ............................. 106/20 D; 346/1.1
[58] Field of Search ..................... 106/20 D; 346/1.1

[56] References Cited

U.S. PATENT DOCUMENTS

| | | | |
|---|---|---|---|
| 3,477,862 | 11/1969 | Forsyth, Jr. | 106/22 |
| 4,014,223 | 3/1977 | Hosada et al. | 523/402 |
| 4,014,833 | 3/1977 | Story | 260/29.2 EP |
| 4,184,881 | 1/1980 | Bradley | 106/20 |
| 4,315,044 | 2/1982 | Elmore et al. | 427/386 |
| 4,337,183 | 6/1982 | Santiago | 524/446 |
| 4,597,794 | 7/1986 | Ohta et al. | 106/20 |
| 4,680,332 | 7/1987 | Harr et al. | 524/377 |
| 4,696,957 | 9/1987 | Adeney et al. | 523/406 |
| 4,705,567 | 11/1987 | Haer et al. | 106/20 |
| 4,945,121 | 7/1990 | Micale et al. | 523/339 |
| 5,001,173 | 3/1991 | Anderson et al. | 523/406 |
| 5,006,170 | 4/1991 | Schwarz et al. | 106/20 |
| 5,049,188 | 9/1991 | Takimoto et al. | 106/20 |

Primary Examiner—Mark L. Bell
Assistant Examiner—Margaret Einsmann
Attorney, Agent, or Firm—Judith L. Byorick

[57] ABSTRACT

Disclosed is an ink composition which comprises an aqueous liquid vehicle, a colorant, and a polymeric additive of the formula

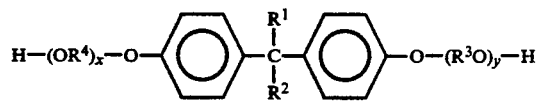

wherein $R^1$ and $R^2$ are independently selected from the group consisting of hydrogen, alkyl groups with from 1 to about 8 carbon atoms, and alkoxy groups with from 1 to about 8 carbon atoms, $R^3$ and $R^4$ are independently selected from the group consisting of alkyl groups with from 1 to about 4 carbon atoms, and x and y are each independently a number of from about 100 to about 400, present in an amount of at least about 1 part per million. The ink is suitable for use in ink jet printing processes, particularly thermal ink jet printing processes.

20 Claims, No Drawings

INK JET PRINTING PROCESSES

This is a division, of application Ser. No. 738,021, filed Jul. 30, 1991 now U.S. Pat. No. 5,207,825.

BACKGROUND OF THE INVENTION

The present invention is directed to ink compositions. More specifically, the present invention is directed to aqueous based ink compositions suitable for use in ink jet printing systems. One embodiment of the present invention is directed to an ink composition which comprises an aqueous liquid vehicle, a colorant, and a polymeric additive of the formula

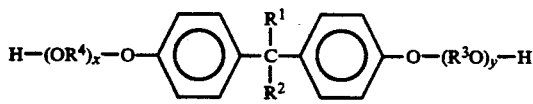

wherein $R^1$ and $R^2$ are independently selected from the group consisting of hydrogen, alkyl groups with from 1 to about 8 carbon atoms, and alkoxy groups with from 1 to about 8 carbon atoms, $R^3$ and $R^4$ are independently selected from the group consisting of alkyl groups with from 1 to about 4 carbon atoms, and x and y are each independently a number of from about 100 to about 400, present in an amount of at least about 1 part per million.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

Known ink jet inks generally comprise a water soluble dye which is soluble in an ink vehicle such as water or a mixture comprising water and a water soluble or water miscible organic solvent. For example, U.S. Pat. No. 4,184,881 (Bradley) discloses an ink composition for use in ink jet printing comprising an aqueous solution of a water soluble dye and a humectant consisting of ethylene oxide adducts of at least one acetylenic diol in the absence of any glycol or glycol ether. In addition, U.S. Pat. No. 4,337,183 (Santiago) discloses an aqueous printing ink composition which comprises a physical mixture of polyurethane resin, polyethylene resin, and water as the vehicle. The invention provides a family of water based inks with enhanced physical and mechanical properties, superior abrasion resistance, and good adhesion to various substrates. Further, U.S. Pat. No. 3,477,862 (Forsyth) discloses an ink comprising a dyestuff, a solution of high molecular weight polyethylene oxide and glycerin for employment in a pen, nozzle or other ink applying means to ensure the inscription of a clear continuous solid line on a chart on which the ink applying means is associated as the ink applying means traverses the chart.

Heterophase ink jet inks are also known. For example, U.S. Pat. No. 4,014,833 (Story) discloses a composition and method for improving the ink transfer properties of aqueous printing inks. The composition is an aqueous ink containing from 0.1 to 1.5 percent by weight of a polyethylene oxide resin having a molecular weight in the range of from 100,000 to 350,000. In addition, U.S. Pat. No. 4,680,332 (Hair et al.) discloses a heterophase ink composition which comprises a water insoluble polymer dispersed in a liquid medium, the polymer containing therein an oil soluble dye, and a nonionic stabilizer permanently attached thereto. The polymer may include styrene, parachlorostyrene, vinyl naphthalene, and acrylates wherein the carbon chain length is from about 1 to about 18 carbon atoms. The stabilizers may include ethylene oxide and propylene oxide block copolymers. Further, U.S. Pat. No. 4,705,567 (Hair et al.) discloses a heterophase ink jet ink composition which comprises water and a dye covalently attached to a component selected from the group consisting of poly(ethylene glycols) and poly(ethylene imines), which component is complexed with a heteropolyanion. In addition, U.S. Pat. No. 4,597,794 (Ohta et al.) discloses an ink jet recording process which comprises forming droplets of an ink and recording on an image receiving material by using the droplets, wherein the ink is prepared by dispersing fine particles of a pigment into an aqueous dispersion medium containing a polymer having both a hydrophilic and a hydrophobic construction portion. The hydrophilic portion constitutes a polymer of monomers having mainly polymerizable vinyl groups into which hydrophilic portions such as carboxylic acid groups, sulfonic acid groups, sulfate groups, and the like are introduced. Pigment particle size may be from several microns to several hundred microns. The ink compositions disclosed may also include additives such as surfactants, salts, resins, and dyes.

Although known compositions and processes are suitable for their intended purposes, a need remains for improved ink compositions. A need also remains for ink compositions suitable for use in ink jet printers. In addition, there is a need for ink compositions that when used in ink jet printing processes result in uniform drop size over varying drop frequencies. Further, a need exists for ink compositions that when used in ink jet printing processes result in uniform drop speed over varying frequencies. Additionally, a need remains for ink compositions that when used in ink jet printing processes result in relatively large drop sizes; large drop sizes are desirable because they enable greater area coverage on the receiver sheet, provide greater efficiency, and require less heat increase, thereby enabling the use of smaller heaters in a thermal ink jet printing apparatus. In addition, a need exists for ink compositions that when used in ink printing processes result in few or no detectable missing drops. Further, a need remains for ink compositions that when used in ink jet printing processes result in reduced drop satellites; drop satellites are secondary drops that issue from the nozzle or channel after the primary drop has been ejected, resulting in undesired spots on the receiver sheet. Additionally, there is a need for ink compositions having the above advantages accompanied by acceptable latency, surface tension, and viscosity values. There is also a need for ink jet printing processes with inks exhibiting the above noted advantages. A need also exists for thermal ink jet printing processes using inks exhibiting the above noted advantages. Further, there is a need for ink compositions that exhibit short drop transit times and enable good drop directionality when used in thermal ink jet printing processes. Additionally, there is a need for ink compositions that result in reduced or eliminated jitter when used in thermal ink jet printing processes; jitter refers to the degree of variation in drop speed, and reduced jitter entails more uniform drop speeds during the printing process.

SUMMARY OF THE INVENTION

It is an object of the present invention to provide improved ink compositions.

It is another object of the present invention to provide ink compositions suitable for use in ink jet printers.

It is yet another object of the present invention to provide ink compositions that when used in ink jet printing processes result in uniform drop size over varying drop frequencies.

It is still another object of the present invention to provide ink compositions that when used in ink jet printing processes result in uniform drop speed over varying frequencies.

Another object of the present invention is to provide ink compositions that when used in ink jet printing processes result in relatively large drop sizes.

Yet another object of the present invention is to provide ink compositions that when used in ink jet printing processes result in few or no detectable missing drops.

Still another object of the present invention is to provide ink compositions that when used in ink jet printing processes result in reduced drop satellites.

It is another object of the present invention to provide ink compositions having the above advantages accompanied by acceptable latency, surface tension, and viscosity values.

It is yet another object of the present invention to provide ink jet printing processes with inks exhibiting the above noted advantages.

It is still another object of the present invention to provide thermal ink jet printing processes using inks exhibiting the above noted advantages.

Another object of the present invention is to provide ink compositions that exhibit short drop transit times and enable good drop directionality when used in thermal ink jet printing processes.

Yet another object of the present invention is to provide ink compositions that result in reduced or eliminated jitter when used in thermal ink jet printing processes.

These and other objects of the present invention (or specific embodiments thereof) can be achieved by providing an ink composition which comprises an aqueous liquid vehicle, a colorant, and a polymeric additive of the formula

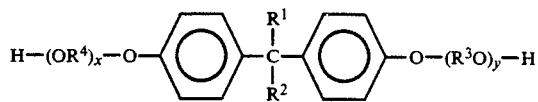

wherein $R^1$ and $R^2$ are independently selected from the group consisting of hydrogen, alkyl groups with from 1 to about 8 carbon atoms, and alkoxy groups with from 1 to about 8 carbon atoms. $R^3$ and $R^4$ are independently selected from the group consisting of alkyl groups with from 1 to about 4 carbon atoms, and x and y are each independently a number of from about 100 to about 400, present in an amount of at least about 1 part per million. Another embodiment of the present invention is directed to a process which comprises incorporating into an ink jet printing apparatus an ink which comprises an aqueous liquid vehicle, a colorant, and a polymeric additive of the formula

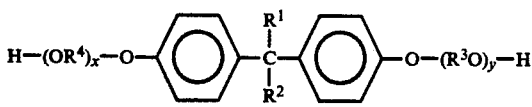

wherein $R^1$ and $R^2$ are independently selected from the group consisting of hydrogen, alkyl groups with from 1 to about 8 carbon atoms, and alkoxy groups with from 1 to about 8 carbon atoms, $R^3$ and $R^4$ are independently selected from the group consisting of alkyl groups with from 1 to about 4 carbon atoms, and x and y are each independently a number of from about 100 to about 400, present in an amount of at least about 1 part per million, and causing droplets of the ink composition to be ejected in an imagewise pattern onto a substrate. In a particularly preferred embodiment, the printing apparatus employs a thermal ink jet process, wherein the droplets of ink are caused to be ejected by heating the ink and causing bubbles to form therein.

The liquid vehicle of the inks of the present invention may consist of water, or it may comprise a mixture of water and a miscible organic component, such as ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, alcohol derivatives, carbitol, butyl carbitol, cellusolve, ether derivatives, amino alcohols, ketones, N-methylpyrrolidinone, cyclohexylpyrrolidone, hydroxyethers, amides, sulfoxides, lactones, and other water miscible materials, as well as mixtures thereof. When mixtures of water and water miscible organic liquids are selected as the liquid vehicle, the water to organic ratio may be in any effective range, and typically is from about 100:0 to about 30:70, preferably from about 97:3 to about 50:50, although the ratio can be outside this range. The non-water component of the liquid vehicle generally serves as a humectant which has a boiling point higher than that of water (100° C.). In the inks of the present invention, the liquid vehicle (comprising water plus humectant) is generally present in an amount of from about 60 to about 99.5 percent by weight, and preferably from about 75 to about 99 percent by weight, although the amount can be outside of this range.

Inks of the present invention contain a colorant. Generally, any effective dye, such as one of the direct dyes or the acid dyes, can be selected as the colorant, provided that it is compatible with the other ink components and is soluble in the liquid vehicle. Examples of suitable dyes include Bernacid Red 2BMN, Pontamine Brilliant Bond Blue A, BASF X-34, Pontamine, Food Black 2, Carodirect Turquoise FBL Supra Conc. (Direct Blue 199), available from Carolina Color and Chemical, Special Fast Turquoise 8GL Liquid (Direct Blue 86), available from Mobay Chemical, Intrabond Liquid Turquoise GLL (Direct Blue 86), available from Crompton and Knowles, Cibracron Brilliant Red 38-A (Reactive Red 4), available from Aldrich Chemical, Drimarene Brilliant Red X-2B (Reactive Red 56), available from Pylam, Inc., Levafix Brilliant Red E-4B, available from Mobay Chemical, Levafix Brilliant Red E-6BA, available from Mobay Chemical, Procion Red H8B (Reactive Red 31), available from ICI America, Pylam Certified D&C Red #28 (Acid Red 92), available from Pylam, Direct Brill Pink B Ground Crude, available from Crompton & Knowles, Cartasol Yellow GTF Presscake, available from Sandoz, Inc., Tartrazine Extra Conc. (FD&C Yellow #5, Acid Yellow 23), available from Sandoz, Carodirect Yellow RL (Direct Yellow 86), available from Carolina Color and Chemical, Cartasol Yellow GTF Liquid Special 110, available from Sandoz, Inc., D&C Yellow #10 (Acid Yellow 3), available from Tricon, Yellow Shade 16948, available from Tricon, Basacid Black X34, available from BASF, Carta Black 2GT, available from Sandoz, Inc., Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Spirit Fast Yellow 3G, Aizen Spilon Yellow C-GNH (Hodagaya Chemical Company), Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI), Morfast Black Conc A (Morton-Thiokol), Diazol Black RN Quad (ICI), Orasol Blue GN (Ciba-Geigy), Savinyl Blue GLS (Sandoz), Luxol Blue MBSN (Morton-Thiokol), Sevron Blue 5GMF (ICI), Basacid Blue 750 (BASF), Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, available from Bayer, Procion Turquoise PA, Procion Turquoise HA, Procion Turquoise H-5G, Procion Turquoise H-7G, Procion Red MX-5B, Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, available from ICI, Cibacron Red F-B, Cibacron Black BG, Lanasol Black B, Lanasol Red 5B, Lanasol Red B, and Lanasol Yellow 4G, available from Ciba-Geigy, Basilen Black P-BR, Basilen Yellow EG, Basilen Brilliant Yellow P-3GN, Basilen Yellow M-6GD, Basilen Brilliant Red P-3B, Basilen Scarlet E-2G, Basilen Red E-B, Basilen Red E-7B, Basilen Red M-5B, Basilen Blue E-R, Basilen Brilliant Blue P-3R, Basilen Black P-BR, Basilen Turquoise Blue P-GR, Basilen Turquoise M-2G, Basilen Turquoise E-G, and Basilen Green E-6B, available from BASF, Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, available from Sumitomo Chemical Company, Intracron Yellow C-8G, Intracron Red C-8B, Intracron Turquoise Blue GE, INtracron Turquoise HA, and Intracron Black RL, available from Crompton and Knowles, Dyes and Chemicals Division, and the like. Dyes that are invisible to the naked eye but detectable when exposed to radiation outside the visible wavelength range (such as ultraviolet or infrared radiation), such as dansyl-lysine, N-(2-aminoethyl)-4-amino-3,6-disulfo-1,8-dinaphthalimide dipotassium salt, N-(2-aminopentyl)-4-amino-3,6-disulfo-1,8-dinaphthalimide dipotassium salt, Cascade Blue ethylenediamine trisodium salt, Cascade Blue ethylenediamine trisodium salt (available from Molecular Proes, Inc.), Cascade Blue cadaverine trisodium salt (available from Molecular Proes, Inc.), bisdiazinyl derivatives of 4,4'-diaminostilbene-2,2'-disulfonic acid, amide derivatives of 4,4'-diaminostilbene-2,2'-disulfonic acid, phenylurea derivatives of 4,4'-disubstituted stilbene-2,2'-disulfonic acid, mono- or di-naphthyltriazole derivatives of 4,4'-disubstituted stilbene disulfonic acid, derivatives of benzithiazole, derivatives of benzoxazole, derivatives of benziminazole, derivatives of coumarin, derivatives of pyrazolines containing sulfonic acid groups, 4,4'-bis(-triazin-2-ylamino)stilbene-2,2'-disulfonic acids, 2-(stilben-4-yl)naphthotriazoles, 2-(4-phenylstilben-4-yl)benzoxazoles, 4,4'-bis(triazo-2-yl)stilbene-2,2'-disulfonic acids, 1,4-bis(styryl)biphenyls, 1,3-diphenyl-2-pyrazolines, bis(benzazol-2-yl) derivatives, 3-phenyl-7-(triazin-2-yl)coumarins, carbostyrils, naphthalimides, 3,7-diaminodibenzothiophen-2,8-disulfonic acid-5,5-dioxide, other commercially available materials, such as C.I. Fluorescent Brightener No. 28 (C.I. 40622), the fluorescent series Leucophor B-302, BMB (C.I. 290), BCR, BS, and the like (available from Leucophor), and the like, are also suitable. The dye is present in the ink composition in any effective amount, generally from about 1 to about 15 percent by weight, and preferably from about 2 to about 7 percent by weight (wherein the amount refers to the amount of dye molecules present in the ink), although the amount can be outside of this range.

In addition, the colorant for the ink compositions of the present invention can be a pigment, or a mixture of one or more dyes and/or one or more pigments. The pigment can be black, cyan, magenta, yellow, red, blue, green, brown, mixtures thereof, and the like. Examples of suitable black pigments include various carbon blacks such as channel black, furnace black, lamp black, and the like. Colored pigments include red, green, blue, brown, magenta, cyan, and yellow particles, as well as mixtures thereof. Illustrative examples of magenta pigments include 2,9-dimethyl-substituted quinacridone and anthraquinone dye, identified in the Color Index as CI 60710, CI Dispersed Red 15, a diazo dye identified in the Color Index as CI 26050, CI Solvent Red 19, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments include Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (American Hoechst), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FG1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kublmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF). Other pigments can also be selected. Preferably, the pigment particle size is as small as possible to enable a stable colloidal suspension of the particles in the liquid vehicle and to prevent clogging of the ink channels when the ink is used in a thermal ink jet printer. Preferred particle average diameters are generally from about 0.001 to about 0.1 micron. The pigment is present in the ink composition in any effective amount, generally from about 1 to about 7 percent by weight and preferably from about 2 to about 5 percent by weight, although the amount can be outside of this range.

The ink compositions of the present invention also contain a polymeric additive consisting of two polyalkylene oxide chains bound to a central moiety. This additive is of the formula

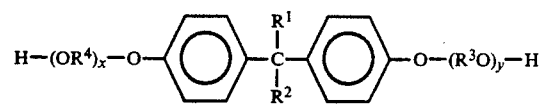

wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in *Polyethers*, N. G. Gaylord, John Wiley & Sons, New York (1963) and "Laboratory Synthesis of Polyethylene Glycol Derivatives," J. M. Harris, J. *Molecular Science-Rev. Macromol. Chem. Phys.*, C25(3), 325-373 (1985), the disclosures of each of which are totally incorporated herein by reference. The additive is generally present in the ink in an amount of at least about 1 part per million. Typically, the additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem.

Other additives can also be present in the inks of the present invention. For example, one or more surfactants or wetting agents can be added to the ink. These additives may be of the cationic, anionic, or nonionic types. Suitable surfactants and wetting agents include sodium lauryl sulfate, Tamol ® SN, Tamol ® LG, those of the Triton ® series available from Rohm and Haas Company, those of the Marasperse ® series, those of the Igepal ® series available from GAF Company, those of the Tergitol ® series, and other commercially available surfactants. These surfactants and wetting agents are present in effective amounts, generally from 0 to about 15 percent by weight, and preferably from about 0.01 to about 8 percent by weight, although the amount can be outside of this range.

Polymeric additives can also be added to the inks of the present invention to enhance the viscosity of the ink and the stability of the pigment particles and to reduce the rate of agglomeration and precipitation of the particles. Water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, and the like are particularly useful for stabilizing pigment particles in a water based liquid vehicle such as water or a mixture of water and a water miscible organic liquid. Polymeric stabilizers may be present in the ink of the present invention in amounts of from 0 to about 10 percent by weight, and preferably from about 0.01 to about 5 percent by weight, although the amount can be outside of this range.

Other optional additives to the inks of the present invention include biocides such as Dowicil 150, 200, and 75, benzoate salts, sorbate salts, and the like, present in an amount of from about 0.0001 to about 4 percent by weight, and preferably from about 0.01 to about 2.0 percent by weight, pH controlling agents such as acids or, bases, phosphate salts, carboxylates salts, sulfite salts, amine salts, and the like, present in an amount of from 0 to about 1 percent by weight and preferably from about 0.01 to about 1 percent by weight, or the like.

The ink compositions of the present invention are generally of a viscosity suitable for use in thermal ink jet printing processes. Typically, the ink viscosity is no more than about 5 centipoise, and preferably is from about 1 to about 2.5 centipoise.

Ink compositions of the present invention can be prepared by any suitable process. Typically, the inks are prepared by simple mixing of the ingredients. One process entails mixing all of the ink ingredients together and filtering the mixture to obtain an ink. Inks of the present invention can be prepared by preparing a conventional ink composition according to any desired process, such as by mixing the ingredients, heating if desired, and filtering, followed by adding the ink additive of the present invention to the mixture and mixing at room temperature with moderate shaking until a homogeneous mixture is obtained, typically from about 5 to about 10 minutes. Alternatively, the ink additive of the present invention can be mixed with the other ink ingredients during the ink preparation process, which takes place according to any desired procedure, such as by mixing all the ingredients, heating if desired, and filtering.

The present invention is also directed to a process which entails incorporating an ink composition of the present invention into an ink jet printing apparatus and causing droplets of the ink composition to be ejected in an imagewise pattern onto a substrate. In a particularly preferred embodiment, the printing apparatus employs a thermal ink jet process wherein the ink in the nozzles is selectively heated in an imagewise pattern, thereby causing droplets of the ink to be ejected in imagewise pattern. Any suitable substrate can be employed, including plain papers such as Xerox ® 4024 papers, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

An ink composition comprising 2.5 percent by weight of Tartrazine FD&C Yellow #5, a yellow dye obtained from Buffalo Color, West Patterson, N.Y., 15 percent by weight of cyclohexyl pyrrolidone (obtained from GAF Corporation, Wayne, N.J.), 1 percent by weight of sodium lauryl sulfate (obtained from Fisher Scientific, Fair Lawn, N.J.), and 81.5 percent by weight of deionized water was prepared by mixing together the ingredients at room temperature, stirring to obtain a homogeneous solution, and filtering. Two additional inks were also prepared, said inks being of the same composition as the first except that one contained 0.1 percent by weight of Carbowax M20 (a polyethylene oxide/bisphenol-A polymer of the formula

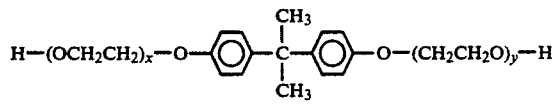

with a molecular weight of 18,000, obtained from Union Carbide Corporation, Danbury, Conn.) and the other contained 0.3 percent by weight of Carbowax M20. The Carbowax M20 was added to the ink at room temperature and the resulting mixture was stirred for about 5 minutes to obtain a homogeneous solution.

The inks thus prepared were incorporated into a jetting test fixture having 300 spots per inch with a heater voltage applied at about 38 volts (about 10 percent above the minimum voltage required to fire drops of the ink). The drop speed to travel 0.5 millimeter was then measured as a function of frequency with the following results:

Ink containing no Carbowax M20

| Frequency (Hertz) | Drop Speed (Transit Time - microseconds) |
|---|---|
| 70 | 85 |
| 170 | 87 |
| 350 | 95 |
| 700 | 105 |
| 1500 | 113 |
| 2000 | 115 |
| 2800 | 120 |
| 3300 | 130 |
| 3800 | 140 |
| 5000 | 148 |
| 5100 | 145 |
| 5800 | 138 |
| 6000 | 130 |
| 6100 | 125 |

Ink containing 0.1 percent Carbowax M20

| Frequency (Hertz) | Drop Speed (Transit Time - microseconds) |
|---|---|
| 70 | 68 |
| 170 | 67 |
| 350 | 73 |
| 700 | 72 |
| 1500 | 75 |
| 2000 | 76 |
| 3000 | 77 |
| 3500 | 79 |
| 4000 | 81 |
| 5000 | 80 |
| 5200 | 77 |
| 5800 | 75 |
| 6000 | 72 |
| 6300 | 70 |

Ink containing 0.3 percent Carbowax M20

| Frequency (Hertz) | Drop Speed (Transit Time - microseconds) |
|---|---|
| 70 | 63 |
| 170 | 67 |
| 400 | 70 |
| 800 | 72 |
| 1800 | 73 |
| 2500 | 74 |
| 3300 | 78 |
| 4000 | 81 |
| 5000 | 80 |
| 6000 | 80 |
| 6500 | 78 |
| 7000 | 73 |

As the data indicate, for the ink containing no polyethylene oxide/bisphenol-A additive the drop speed decreased by about 50 percent over a frequency range of 1,000 to 5,000 Hertz. It was also observed that the drop volume decreased as frequency was increased with this ink. For the ink containing 0.1 percent of the polyethylene oxide/bisphenol-A additive the drop speed was relatively constant over the indicated frequency range, and even at low frequencies the drop speed increased about 20 to 30 percent over the ink containing no polyethylene oxide/bisphenol-A additive. The usable frequency increased to about 8,000 Hertz. Similar results were observed for the ink containing 0.3 percent by weight of the polyethylene oxide/bisphenol-A additive. For both inks containing the additive, drop volume remained relatively constant over the indicated frequency range.

EXAMPLE II

An ink composition containing 2.5 percent by weight of Tartrazine FD&C Yellow #5, a yellow dye obtained from Buffalo Color, West Patterson, N.Y., 15 percent by weight of ethylene glycol, 0.3 percent by weight of Carbowax M20, and 82.2 percent by weight of water was prepared by mixing together the ingredients at room temperature, stirring for about 10 minutes to obtain a homogeneous solution, and filtering.

The ink thus prepared was incorporated into a jetting test fixture having 300 spots per inch with a heater voltage applied at about 38 volts (about 10 percent above the minimum voltage required to fire drops of the ink). The drop speed to travel 0.5 millimeter was then measured as a function of frequency with the following results:

| Frequency (Hertz) | Drop Speed (Transit Time - microseconds) |
|---|---|
| 70 | 55 |
| 170 | 55 |
| 400 | 60 |
| 800 | 57 |
| 1700 | 59 |
| 2400 | 59 |
| 3200 | 64 |
| 4000 | 69 |
| 5000 | 69 |
| 5500 | 68 |
| 5800 | 72 |
| 6000 | 74 |
| 6200 | 75 |
| 6300 | 75 |
| | Drop Volume (picoliters) |
| 1000 | 118 |
| 2000 | 116 |
| 3500 | 121 |
| 6000 | 128 |
| 8000 | 125 |
| 8500 | 110 |
| 9000 | 96 |

As the data indicate, the frequency response in terms of both drop volume and drop speed was nearly flat up to a frequency of about 5000, which is generally regarded as the maximum usable frequency. In addition, the drop volume was measured up to about 130 picoliters, which was almost twice that observed for an ink of similar composition but containing no polyethylene oxide/bisphenol-A additive.

EXAMPLE III

An ink composition containing 6 percent by weight of Special Black 7984 (Food Black #2), a black dye obtained from Mobay Chemical Company, 15 percent by weight of cyclohexyl pyrrolidone, obtained from GAF Corporation, Wayne, N.J., 1 percent by weight of sodium lauryl sulfate (obtained from Fisher Scientific, Fair Lawn, N.J.), and 78 percent by weight of water was prepared by mixing together the ingredients at room temperature, stirring for about 10 minutes to obtain a homogeneous solution, and filtering. Another ink of the same composition except that it contained 0.1 percent by weight of Carbowax M20 was prepared by adding the appropriate amount of Carbowax M20 to an aliquot of the first ink.

The ink thus prepared were incorporated into a jetting test fixture having 300 spots per inch with a heater voltage applied at about 38 volts (about 10 percent above the minimum voltage required to fire drops of the ink). The drop speed to travel 0.5 millimeter was then measured as a function of frequency with the following results:

| Frequency (Hertz) | Mean Drop Speed (Transit Time - microseconds) | Drop Speed Standard Deviation |
|---|---|---|
| 60 | 89.34 | 6.07 |
| 120 | 94.75 | 7.19 |
| 300 | 99.50 | 9.05 |
| 600 | 107.12 | 10.82 |
| 1200 | 114.48 | 9.23 |
| 1800 | 120.49 | 8.31 |
| 2400 | 125.89 | 8.67 |
| 3000 | 128.04 | 8.73 |
| 3600 | 136.77 | 9.69 |
| 4200 | 145.21 | 9.74 |
| 4440 | 150.02 | 11.58 |
| 4680 | 150.96 | 13.91 |
| 4920 | 152.89 | 8.82 |
| 5160 | 148.74 | 13.73 |
| 5400 | 137.02 | 34.03 |
| 5520 | 96.57 | 59.21 |
| 5640 | 61.83 | 62.35 |
| 5760 | 31.66 | 47.40 |
| 5880 | 13.14 | 22.04 |
| 6000 | 9.07 | 11.16 |

Ink containing no Carbowax M20

| Frequency (Hertz) | Mean Drop Speed (Transit Time - microseconds) | Drop Speed Standard Deviation |
|---|---|---|
| 70 | 63.44 | 3.69 |
| 140 | 66.05 | 3.68 |
| 350 | 68.81 | 3.38 |
| 700 | 70.24 | 2.35 |
| 1400 | 74.97 | 2.14 |
| 2100 | 77.04 | 2.16 |
| 2800 | 77.06 | 2.17 |
| 3500 | 78.31 | 2.37 |
| 4200 | 82.72 | 2.65 |
| 4900 | 79.56 | 2.32 |
| 5180 | 77.24 | 2.32 |
| 5460 | 74.44 | 2.04 |
| 5740 | 72.35 | 2.09 |
| 6020 | 70.39 | 2.05 |
| 6300 | 69.05 | 2.11 |
| 6440 | 68.08 | 1.76 |
| 6580 | 67.05 | 1.79 |
| 6720 | 66.82 | 1.87 |
| 6860 | 66.48 | 1.94 |
| 7000 | 65.53 | 1.54 |

Ink containing 0.1 percent by weight Carbowax M20

| Frequency (Hertz) | Drop Volume (picoliters) |
|---|---|
| 1000 | 110 |
| 2000 | 108 |
| 3000 | 100 |
| 5000 | 92 |

Ink containing 0.1 percent by weight Carbowax

As the data indicate, for the ink containing the Carbowax M20, the frequency response in terms of both drop volume and drop speed was nearly flat up to a frequency of about 5000, which is generally regarded as the maximum usable frequency, whereas the ink containing no Carbowax M20 exhibited a wider drop speed variation. In addition, the standard deviation in drop speed, which is an indication of jitter, was significantly lower for the ink containing the Carbowax M20 than for the ink containing no Carbowax M20, indicating that the presence of the additive greatly reduced jitter.

EXAMPLE IV

An ink composition comprising 2.5 percent by weight of Tartrazine FD&C Yellow #5, a yellow dye obtained from Buffalo Color, West Patterson, N.Y., 15 percent by weight of cyclohexyl pyrrolidone (obtained from GAF Corporation, Wayne, N.J.), and 82.5 percent by weight of deionized water was prepared by mixing together the ingredients at room temperature, stirring to obtain a homogeneous solution, and filtering. An additional ink was also prepared, said ink being of the same composition as the first except that it contained 0.3 percent by weight of Carbowax M20. The Carbowax M20 was added to the ink at room temperature and the resulting mixture was stirred for about 5 minutes to obtain a homogeneous solution.

The inks thus prepared were incorporated into a jetting test fixture having 300 spots per inch with a heater voltage applied at about 38 volts (about 10 percent above the minimum voltage required to fire drops of the ink). The drop speed to travel 0.5 millimeter was then measured as a function of frequency with the following results:

| Frequency (Hertz) | Drop Speed (Transit Time - microseconds) | Drop Speed Standard Deviation |
|---|---|---|
| 70 | 60.48 | 0.93 |
| 140 | 60.64 | 1.17 |
| 350 | 62.24 | 1.85 |
| 700 | 69.08 | 4.62 |
| 1400 | 68.43 | 2.17 |
| 2100 | 73.17 | 5.34 |
| 2800 | 75.11 | 5.95 |
| 3500 | 77.32 | 5.64 |
| 4200 | 80.06 | 6.09 |
| 4900 | 77.39 | 6.74 |
| 5180 | 76.85 | 6.84 |
| 5460 | 76.66 | 8.23 |
| 5740 | 69.24 | 5.80 |
| 6020 | 66.44 | 4.11 |
| 6300 | 68.67 | 6.54 |
| 6440 | 66.16 | 5.92 |
| 6580 | 67.20 | 6.66 |
| 6720 | 64.84 | 6.90 |
| 6860 | 61.79 | 3.65 |
| 7000 | 63.11 | 4.38 |

Ink containing no Carbowax M20

| Frequency (Hertz) | Drop Speed (Transit Time - microseconds) | Drop Speed Standard Deviation |
|---|---|---|
| 70 | 53.93 | 3.85 |
| 140 | 56.53 | 2.76 |
| 350 | 60.53 | 8.44 |
| 700 | 56.82 | 3.29 |
| 1400 | 56.51 | 1.63 |
| 2100 | 56.81 | 1.12 |
| 2800 | 56.79 | 1.15 |
| 3500 | 60.09 | 1.22 |
| 4200 | 61.21 | 1.63 |
| 4900 | 60.10 | 1.32 |
| 5180 | 58.90 | 1.26 |
| 5460 | 57.14 | 1.28 |
| 5740 | 54.98 | 1.25 |
| 6020 | 52.87 | 1.06 |
| 6300 | 51.51 | 1.05 |
| 6440 | 50.89 | 1.07 |
| 6580 | 50.34 | 0.93 |
| 6720 | 49.73 | 1.06 |
| 6860 | 49.47 | 0.88 |

-continued

| Frequency (Hertz) | Drop Speed (Transit Time - microseconds) | Drop Speed Standard Deviation |
|---|---|---|
| 7000 | 48.71 | 0.95 |

Ink containing 0.3 percent Carbowax M20

As the data indicate, for the ink containing the Carbowax M20, the frequency response in terms of both drop volume and drop speed was nearly flat up to a frequency of about 5000, which is generally regarded as the maximum usable frequency, whereas the ink containing no Carbowax M20 exhibited a wider drop speed variation. In addition, the standard deviation in drop speed, which is an indication of jitter, was significantly lower for the ink containing the Carbowax M20 than for the ink containing no Carbowax M20, indicating that the presence of the additive greatly reduced jitter.

EXAMPLE V

An ink composition containing 5 percent by weight of Special Black 7984 (Food Black #2), a black dye obtained from Mobay Chemical Company, 10 percent by weight of cyclohexyl pyrrolidone, obtained from GAF Corporation, Wayne, N.J., 5 percent by weight of ethylene glycol, 2 percent by weight of Nacconol 90 G, a sodium alkylbenzene sulfonate surfactant obtained from Stepan Chemical Company, Northfield, Ill., and 78 percent by weight of water was prepared by mixing together the ingredients at room temperature, stirring for about 10 minutes to obtain a homogeneous solution, and filtering. Another ink of the same composition except that it contained 0.1 percent by weight of Carbowax M20 was prepared by adding the appropriate amount of Carbowax M20 to an aliquot of the first ink.

The inks thus prepared were incorporated into a jetting test fixture having 300 spots per inch with a heater voltage applied at about 38 volts (about 10 percent above the minimum voltage required to fire drops of the ink). The drop speed to travel 0.5 millimeter was then measured as a function of frequency with the following results:

| Frequency (Hertz) | Drop Volume (picoliters) |
|---|---|
| 1000 | 81 |
| 2000 | 80 |
| 4000 | 79 |
| 5000 | 73 |

Ink containing 0.1 percent by weight Carbowax M20

| Frequency (Hertz) | Mean Drop Speed (Transit Time - microseconds) | Drop Speed Standard Deviation |
|---|---|---|
| 70 | 94.93 | 4.64 |
| 140 | 99.45 | 6.83 |
| 350 | 111.96 | 6.83 |
| 700 | 126.37 | 11.21 |
| 1400 | 153.62 | 11.79 |
| 2100 | 163.99 | 13.32 |
| 2800 | 170.98 | 15.46 |
| 3500 | 175.94 | 16.26 |
| 4200 | 180.60 | 13.83 |
| 4900 | 123.11 | 65.41 |
| 5180 | 89.28 | 70.02 |
| 5460 | 21.45 | 36.42 |
| 5740 | 15.28 | 22.79 |
| 6020 | 14.32 | 19.34 |
| 6300 | 16.65 | 13.96 |
| 6440 | 15.85 | 11.91 |

-continued

| Frequency (Hertz) | Mean Drop Speed (Transit Time - microseconds) | Drop Speed Standard Deviation |
|---|---|---|
| 6580 | 16.39 | 14.18 |
| 6720 | 17.09 | 12.56 |
| 6860 | 17.25 | 11.11 |
| 7000 | 15.69 | 11.62 |

Ink containing no Carobwax M20

| Frequency (Hertz) | Mean Drop Speed (Transit Time - microseconds) | Drop Speed Standard Deviation |
|---|---|---|
| 70 | 71.91 | 2.43 |
| 140 | 72.51 | 3.05 |
| 350 | 78.33 | 3.98 |
| 700 | 87.24 | 3.86 |
| 1400 | 100.34 | 4.77 |
| 2100 | 103.18 | 5.54 |
| 2800 | 102.54 | 4.64 |
| 3500 | 106.25 | 5.85 |
| 4200 | 101.14 | 6.14 |
| 4900 | 93.95 | 5.21 |
| 5180 | 93.32 | 5.21 |
| 5460 | 91.33 | 4.76 |
| 5740 | 91.96 | 5.26 |
| 6020 | 91.00 | 6.13 |
| 6300 | 88.93 | 7.75 |
| 6440 | 87.81 | 5.86 |
| 6580 | 86.81 | 5.75 |
| 6720 | 87.02 | 6.75 |
| 6860 | 86.96 | 6.86 |
| 7000 | 87.48 | 6.25 |

Ink containing 0.1 percent by weight Carbowax M20

As the data indicate, for the ink containing the Carbowax M20, the frequency response in terms of both drop volume and drop speed was nearly flat up to a frequency of about 5000, which is generally regarded as the maximum usable frequency, whereas the ink containing no Carbowax M20 exhibited a wider drop speed variation. In addition, the standard deviation in drop speed, which is an indication of jitter, was significantly lower for the ink containing the Carbowax M20 than for the ink containing no Carbowax M20, indicating that the presence of the additive greatly reduced jitter. These results were obtained in the presence of an extremely strong surfactant, indicating that the presence of the surfactant did not inhibit the activity of the polyethylene oxide-bisphenol-A additive with respect to achieving the advantages of the present invention.

COMPARATIVE EXAMPLE A

An ink composition comprising 2.5 percent by weight of Tartrazine FD&C Yellow #5, a yellow dye obtained from Buffalo Color, West Patterson, N.Y., 15 percent by weight of cyclohexyl pyrrolidone (obtained from GAF Corporation, Wayne, N.J.), 1 percent by weight of sodium lauryl sulfate (obtained from Fisher Scientific, Fair Lawn, N.J.), 81.2 percent by weight of deionized water, and 0.3 percent by weight of Syn Fac 8009, a polyethylene oxide/bisphenol-A polymer of the formula

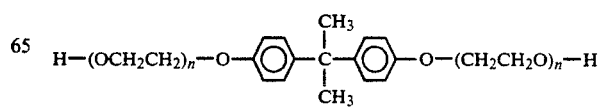

wherein 2n=7 (n is either 3 or 4) (obtained from Milliken Chemical Company, Inman, S.C.) was prepared by mixing together the ingredients at room temperature, stirring to obtain a homogeneous solution, and filtering.

The ink thus prepared was incorporated into a jetting test fixture having 300 spots per inch with a heater voltage applied at about 38 volts (about 10 percent above the minimum voltage required to fire drops of the ink). The drop speed to travel 0.5 millimeter was then measured as a function of frequency with the following results:

| Frequency (Hertz) | Drop Speed (Transit Time - microseconds) | Drop Speed Standard Deviation |
|---|---|---|
| 70 | 89.93 | 4.79 |
| 140 | 94.31 | 7.53 |
| 350 | 111.63 | 7.13 |
| 700 | 119.50 | 6.71 |
| 1400 | 130.65 | 7.93 |
| 2100 | 139.32 | 9.39 |
| 2800 | 144.07 | 10.83 |
| 3500 | 163.89 | 20.67 |
| 4200 | 181.03 | 12.06 |
| 4900 | 141.69 | 52.03 |
| 5180 | 94.16 | 67.65 |
| 5460 | 43.33 | 57.79 |
| 5740 | 23.54 | 37.09 |
| 6020 | 17.77 | 23.44 |
| 6300 | 14.66 | 14.26 |
| 6440 | 17.77 | 13.47 |
| 6580 | 15.15 | 12.47 |
| 6720 | 19.62 | 13.95 |
| 6860 | 22.24 | 15.79 |
| 7000 | 22.04 | 15.50 |

As the data indicate, an ink containing a polyethylene oxide/bisphenol-A polymer wherein the alkylene oxide chain lengths are not within the lengths specified for the present invention does not enable the advantages of the present invention. This ink, which is analogous to one prepared in Example I except for the difference in the alkylene oxide chain length in the additive, did not enable more rapid drop speeds or more uniform drop speeds as a function of frequency.

COMPARATIVE EXAMPLE B

An ink composition comprising 2.5 percent by weight of Tartrazine FD&C Yellow #5, a yellow dye obtained from Buffalo Color, West Patterson, N.Y., 15 percent by weight of cyclohexyl pyrrolidone (obtained from GAF Corporation, Wayne, N.J.), 1 percent by weight of sodium lauryl sulfate (obtained from Fisher Scientific, Fair Lawn, N.J.), 81.2 percent by weight of deionized water, and 0.3 percent by weight of Syn Fac 8025, a polyethylene oxide/bisphenol-A polymer of the formula

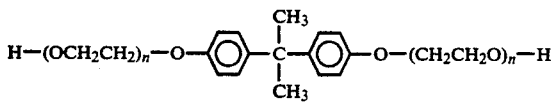

wherein n=5 (obtained from Milliken Chemical Company, Inman, S.C.) was prepared by mixing together the ingredients at room temperature, stirring to obtain a homogeneous solution, and filtering.

The ink thus prepared was incorporated into a jetting test fixture having 300 spots per inch with a heater voltage applied at about 38 volts (about 10 percent above the minimum voltage required to fire drops of the ink). The drop speed to travel 0.5 millimeter was then measured as a function of frequency with the following results:

| Frequency (Hertz) | Drop Speed (Transit Time - microseconds) | Drop Speed Standard Deviation |
|---|---|---|
| 70 | 75.09 | 3.31 |
| 140 | 76.50 | 4.57 |
| 350 | 87.80 | 7.25 |
| 700 | 94.75 | 8.34 |
| 1400 | 105.08 | 7.82 |
| 2100 | 111.84 | 9.05 |
| 2800 | 114.50 | 8.06 |
| 3500 | 119.72 | 8.71 |
| 4200 | 130.30 | 9.77 |
| 4900 | 132.50 | 10.26 |
| 5180 | 129.21 | 10.30 |
| 5460 | 122.24 | 9.62 |
| 5740 | 119.89 | 8.79 |
| 6020 | 115.32 | 7.77 |
| 6300 | 110.80 | 6.52 |
| 6440 | 109.14 | 6.88 |
| 6580 | 106.30 | 6.83 |
| 6720 | 104.78 | 5.29 |
| 6860 | 103.53 | 5.65 |
| 7000 | 101.25 | 5.44 |

As the data indicate, an ink containing a polyethylene oxide/bisphenol-A polymer wherein the alkylene oxide chain lengths are not within the lengths specified for the present invention does not enable the advantages of the present invention. This ink, which is analogous to one prepared in Example I except for the difference in the alkylene oxide chain length in the additive, did not enable more rapid drop speeds or more uniform drop speeds as a function of frequency.

COMPARATIVE EXAMPLE C

An ink composition comprising 5 percent by weight of Special Black 7984 (Food Black #2), a black dye obtained from Mobay Chemical Company, 15 percent by weight of cyclohexyl pyrrolidone (obtained from GAF Corporation, Wayne, N.J.), 0.5 percent by weight of sodium lauryl sulfate (obtained from Fisher Scientific, Fair Lawn, N.J.), 79.48 percent by weight of deionized water, and 0.02 percent by weight of polyethylene oxide of the formula $HO(CH_2CH_2O)_nH$ wherein n is about 2272, with a molecular weight of about 100,000 (obtained from Union Carbide Corporation, Danbury, Conn.) was prepared by mixing together the ingredients at room temperature, stirring to obtain a homogeneous solution, and filtering.

The ink thus prepared was incorporated into a jetting test fixture having 300 spots per inch with a heater voltage applied at about 38 volts (about 10 percent above the minimum voltage required to fire drops of the ink). The drop speed to travel 0.5 millimeter was then measured as a function of frequency with the following results:

| Frequency (Hertz) | Drop Speed (Transit Time - microseconds) | Drop Speed Standard Deviation |
|---|---|---|
| 70 | 72.66 | 2.03 |
| 140 | 74.15 | 2.92 |
| 350 | 80.05 | 4.69 |
| 700 | 91.07 | 5.82 |
| 1400 | 108.57 | 7.71 |
| 2100 | 113.34 | 6.90 |
| 2800 | 115.86 | 7.64 |
| 3500 | 102.55 | 7.22 |
| 4200 | 95.77 | 11.67 |
| 4900 | 98.44 | 8.75 |

| Frequency (Hertz) | Drop Speed (Transit Time - microseconds) | Drop Speed Standard Deviation |
|---|---|---|
| 5180 | 97.56 | 9.72 |
| 5460 | 96.66 | 10.34 |
| 5740 | 98.10 | 10.00 |
| 6020 | 94.31 | 11.67 |
| 6300 | 92.35 | 11.52 |
| 6440 | 90.93 | 10.22 |
| 6580 | 89.52 | 12.97 |
| 6720 | 90.06 | 13.08 |
| 6860 | 86.31 | 16.51 |
| 7000 | 77.34 | 25.11 |

As the data indicate, an ink containing polyethylene oxide with no central bisphenol-A moiety does not enable improvement in drop speed uniformity or jitter; these values are comparable to those obtained in previous examples for inks containing no additive according to the present invention.

COMPARATIVE EXAMPLE D

An ink composition comprising 2.5 percent by weight of Tartrazine FD&C Yellow #5, a yellow dye obtained from Buffalo Color, West Patterson, N.Y., 15 percent by weight of cyclohexyl pyrrolidone (obtained from GAF Corporation, Wayne, N.J.), 1 percent by weight of sodium lauryl sulfate (obtained from Fisher Scientific, Fair Lawn, N.J.), 81.2 percent by weight of deionized water, and 0.3 percent by weight of methylated polyethylene glycol of the formula $CH_3O(CH_2CH_2O)_nH$ wherein n is about 112, with a molecular weight of 5000 (obtained from Union Carbide Corporation, Danbury, Conn.) was prepared by mixing together the ingredients at room temperature, stirring to obtain a homogeneous solution, and filtering.

The ink thus prepared was incorporated into a jetting test fixture having 300 spots per inch with a heater voltage applied at about 38 volts (about 10 percent above the minimum voltage required to fire drops of the ink). The drop speed to travel 0.5 millimeter was then measured as a function of frequency with the following results:

| Frequency (Hertz) | Drop Speed (Transit Time - microseconds) | Drop Speed Standard Deviation |
|---|---|---|
| 70 | 85.38 | 4.76 |
| 140 | 90.46 | 6.72 |
| 350 | 110.22 | 9.43 |
| 700 | 114.11 | 7.79 |
| 1400 | 126.44 | 10.25 |
| 2100 | 136.43 | 11.08 |
| 2800 | 145.78 | 13.77 |
| 3500 | 146.98 | 11.89 |
| 4200 | 162.58 | 13.24 |
| 4900 | 157.14 | 15.47 |
| 5180 | 151.27 | 9.25 |
| 5460 | 137.47 | 24.34 |
| 5740 | 97.45 | 56.86 |
| 6020 | 86.14 | 54.49 |
| 6300 | 78.28 | 51.94 |
| 6440 | 25.34 | 42.15 |
| 6580 | 63.77 | 46.98 |
| 6720 | 26.99 | 39.49 |
| 6860 | 29.06 | 35.84 |
| 7000 | 15.34 | 16.98 |

As the data indicate, an ink containing a methylated polyethylene glycol does not enable improvement in drop speed uniformity or jitter; these values are comparable to those obtained in previous examples for inks containing no additive according to the present invention.

COMPARATIVE EXAMPLE E

An ink composition comprising 2.5 percent by weight of Tartrazine FD&C Yellow #5, a yellow dye obtained from Buffalo Color, West Patterson, N.Y., 15 percent by weight of cyclohexyl pyrrolidone (obtained from GAF Corporation, Wayne N.J.), 1 percent by weight of sodium lauryl sulfate (obtained from Fisher Scientific, Fair Lawn, N.J.), 81.2 percent by weight of deionized water, and 0.3 percent by weight of polyethylene oxide of the formula $HO(CH_2CH_2O)_nH$ wherein n is about 14, with a molecular weight of 600 (obtained from Union Carbide Corporation, Danbury, Conn.) was prepared by mixing together the ingredients at room temperature, stirring to obtain a homogeneous solution, and filtering.

The ink thus prepared was incorporated into a jetting test fixture having 300 spots per inch with a heater voltage applied at about 38 volts (about 10 percent above the minimum voltage required to fire drops of the ink). The drop speed to travel 0.5 millimeter was then measured as a function of frequency with the following results:

| Frequency (Hertz) | Drop Speed (Transit Time - microseconds) | Drop Speed Standard Deviation |
|---|---|---|
| 70 | 78.72 | 4.54 |
| 140 | 84.82 | 6.36 |
| 350 | 96.97 | 7.96 |
| 700 | 105.43 | 7.55 |
| 1400 | 118.02 | 8.11 |
| 2100 | 127.71 | 10.63 |
| 2800 | 136.52 | 11.05 |
| 3500 | 127.96 | 10.07 |
| 4200 | 125.60 | 15.75 |
| 4900 | 123.62 | 12.85 |
| 5180 | 123.57 | 13.26 |
| 5460 | 115.55 | 13.31 |
| 5740 | 117.35 | 12.61 |
| 6020 | 112.33 | 12.07 |
| 6300 | 109.15 | 10.85 |
| 6440 | 104.63 | 15.19 |
| 6580 | 103.65 | 9.54 |
| 6720 | 96.87 | 16.40 |
| 6860 | 86.57 | 29.08 |
| 7000 | 69.33 | 36.92 |

As the data indicate, an ink containing a polyethylene oxide with no central bisphenol-A moiety does not enable improvement in drop speed uniformity or jitter; these values are comparable to those obtained in previous examples for inks containing no additive according to the present invention.

COMPARATIVE EXAMPLE F

An ink composition comprising 2.5 percent by weight of Tartrazine FD&C Yellow #5, a yellow dye obtained from Buffalo Color, West Patterson, N.Y., 15 percent by weight of cyclohexyl pyrrolidone (obtained from GAF Corporation, Wayne, N.J.), 1 percent by weight of sodium lauryl sulfate (obtained from Fisher Scientific, Fair Lawn, N.J.), 81.48 percent by weight of deionized water, and 0.02 percent by weight of polyethylene oxide of the formula $HO(CH_2CH_2O)_nH$ wherein n is about 2272, with a molecular weight of 100,000 (obtained from Union Carbide Corporation, Danbury, Conn.) was prepared by mixing together the ingredients at room temperature, stirring to obtain a homogeneous solution, and filtering.

The ink thus prepared was incorporated into a jetting test fixture having 300 spots per inch with a heater voltage applied at about 38 volts (about 10 percent above the minimum voltage required to fire drops of the ink). The drop speed to travel 0.5 millimeter was then measured as a function of frequency with the following results:

| Frequency (Hertz) | Drop Speed (Transit Time - microseconds) | Drop Speed Standard Deviation |
|---|---|---|
| 70 | 84.90 | 2.91 |
| 140 | 88.29 | 4.28 |
| 350 | 98.24 | 9.02 |
| 700 | 110.74 | 8.38 |
| 1400 | 117.73 | 8.23 |
| 2100 | 130.01 | 9.25 |
| 2800 | 138.17 | 12.75 |
| 3500 | 146.19 | 15.40 |
| 4200 | 156.23 | 16.24 |
| 4900 | 134.08 | 12.19 |
| 5180 | 134.58 | 11.99 |
| 5460 | 137.30 | 10.58 |
| 5740 | 123.01 | 27.28 |
| 6020 | 73.77 | 55.24 |
| 6300 | 39.33 | 48.53 |
| 6440 | 32.24 | 41.50 |
| 6580 | 30.46 | 41.16 |
| 6720 | 30.08 | 35.83 |
| 6860 | 16.12 | 19.77 |
| 7000 | 12.51 | 11.42 |

As the data indicate, an ink containing a polyethylene oxide with no central bisphenol-A moiety does not enable improvement in drop speed uniformity or jitter; these values are comparable to those obtained in previous examples for inks containing no additive according to the present invention.

COMPARATIVE EXAMPLE G

An ink composition comprising 2.5 percent by weight of Tartrazine FD&C Yellow #5, a yellow dye obtained from Buffalo Color, West Patterson, N.Y., 15 percent by weight of cyclohexyl pyrrolidone (obtained from GAF Corporation, Wayne, N.J.), 1 percent by weight of sodium lauryl sulfate (obtained from Fisher Scientific, Fair Lawn, N.J.), 81.4 percent by weight of deionized water, and 0.1 percent by weight of polyethylene oxide of the formula $HO(CH_2CH_2O)_nH$ wherein n is about 2272, with a molecular weight of 100,000 (obtained from Union Carbide Corporation, Danbury, Conn.) was prepared by mixing together the ingredients at room temperature, stirring to obtain a homogeneous solution, and filtering.

The ink thus prepared was incorporated into a jetting test fixture having 300 spots per inch with a heater voltage applied at about 38 volts (about 10 percent above the minimum voltage required to fire drops of the ink). The drop speed to travel 0.5 millimeter was then measured as a function of frequency with the following results:

| Frequency (Hertz) | Drop Speed (Transit Time - microseconds) | Drop Speed Standard Deviation |
|---|---|---|
| 70 | 81.92 | 4.96 |
| 140 | 87.64 | 5.97 |
| 350 | 93.65 | 6.96 |
| 700 | 107.63 | 6.68 |
| 1400 | 116.95 | 8.18 |
| 2100 | 124.50 | 99.81 |
| 2800 | 130.03 | 10.79 |
| 3500 | 136.76 | 10.20 |
| 4200 | 143.96 | 11.02 |
| 4900 | 148.08 | 11.80 |
| 5180 | 144.48 | 9.67 |
| 5460 | 137.51 | 7.97 |
| 5740 | 131.48 | 7.37 |
| 6020 | 124.43 | 20.03 |
| 6300 | 113.30 | 28.09 |
| 6440 | 108.05 | 26.52 |
| 6580 | 107.08 | 25.80 |
| 6720 | 111.04 | 6.21 |
| 6860 | 99.23 | 29.77 |
| 7000 | 99.71 | 23.88 |

As the data indicate, an ink containing a polyethylene oxide with no central bisphenol-A moiety does not enable improvement in drop speed uniformity or jitter; these values are comparable to those obtained in previous examples for inks containing no additive according to the present invention.

COMPARATIVE EXAMPLE H

An ink composition comprising 2.5 percent by weight of Tartrazine FD&C Yellow #5, a yellow dye obtained from Buffalo Color, West Patterson, N.Y., 15 percent by weight of cyclohexyl pyrrolidone (obtained from GAF Corporation, Wayne, N.J.), 1 percent by weight of sodium lauryl sulfate (obtained from Fisher Scientific, Fair Lawn, N.J.), 81 percent by weight of deionized water, and 0.5 percent by weight of polyethylene oxide of the formula $HO(CH_2CH_2O)_nH$ wherein n is about 2272, with a molecular weight of 100,000 (obtained from Union Carbide Corporation, Danbury, Conn.) was prepared by mixing together the ingredients at room temperature, stirring to obtain a homogeneous solution, and filtering.

The ink thus prepared was incorporated into a jetting test fixture having 300 spots per inch with a heater voltage applied at about 38 volts (about 10 percent above the minimum voltage required to fire drops of the ink). The drop speed to travel 0.5 millimeter was then measured as a function of frequency with the following results:

| Frequency (Hertz) | Drop Speed (Transit Time - microseconds) | Drop Speed Standard Deviation |
|---|---|---|
| 70 | 78.60 | s3.08 |
| 140 | 79.64 | 4.12 |
| 350 | 95.58 | 7.98 |
| 700 | 107.38 | 7.51 |
| 1400 | 115.97 | 8.50 |
| 2100 | 118.69 | 10.34 |
| 2800 | 119.55 | 10.18 |
| 3500 | 112.81 | 10.39 |
| 4200 | 103.96 | 10.58 |
| 4900 | 95.75 | 9.41 |
| 5180 | 95.38 | 9.96 |
| 5460 | 92.45 | 10.99 |
| 5740 | 89.28 | 10.97 |
| 6020 | 88.23 | 11.52 |
| 6300 | 84.94 | 10.59 |
| 6440 | 83.12 | 11.77 |
| 6580 | 79.98 | 13.47 |
| 6720 | 76.98 | 12.02 |
| 6860 | 72.99 | 13.99 |
| 7000 | 71.07 | 14.12 |

As the data indicate, an ink containing a polyethylene oxide with no central bisphenol-A moiety does not enable improvement in drop speed uniformity or jitter; these values are comparable to those obtained in previous examples for inks containing no additive according to the present invention.

Other embodiments and modifications of the present invention may occur to those skilled in the art subsequent to a review of the information presented herein, these embodiments and modifications, as well as equivalents thereof, are also included within the scope of this invention.

What is claimed is:

1. A process which comprises incorporating into an ink jet printer an ink composition comprising an aqueous liquid vehicle, a colorant, and a polymeric additive of the formula

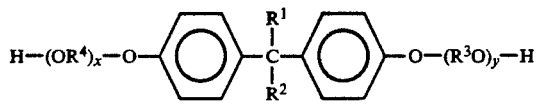

wherein $R^1$ and $R^2$ are independently selected from the group consisting of hydrogen, alkyl groups with from 1 to about 8 carbon atoms, and alkoxy groups with from 1 to about 8 carbon atoms, $R^3$ and $R^4$ are independently selected from the group consisting of alkyl groups with from 1 to about 4 carbon atoms, and x and y are each independently a number of from about 100 to about 400, present in an amount of at least about 1 part per million, and causing droplets of the ink composition to be ejected in an imagewise pattern onto a substrate.

2. A process according to claim 1 wherein x and y are each independently a number of from about 100 to about 200.

3. A process according to claim 1 wherein the polymeric additive is present in an amount of from about 0.0001 percent by weight to about 1 percent by weight.

4. A process according to claim 1 wherein the polymeric additive is present in an amount of from about 0.0001 percent by weight to about 0.5 percent by weight.

5. A process according to claim 1 wherein the polymeric additives of the formula

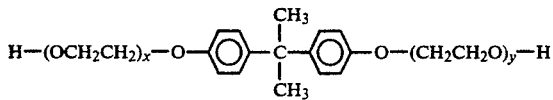

wherein x and y are each independently a number of from about 100 to about 400.

6. A process according to claim 1 wherein the aqueous liquid vehicle comprises water and a humectant.

7. A process according to claim 6 wherein the humectant is cyclohexyl pyrrolidone.

8. A process according to claim 1 wherein the colorant is a dye.

9. A process according to claim 1 wherein the colorant is a pigment.

10. A process according to claim 1 wherein the liquid vehicle is present in an amount of from about 75 to about 99 percent by weight and the colorant is present in an amount of from about 1 to about 15 percent by weight.

11. A process according to claim 1 wherein the polymeric additive has a molecular weight of from about 14,000 to about 22,000.

12. A process according to claim 1 wherein the viscosity of the ink is from about 1 to about 5 centipoise.

13. A process according to claim 1 wherein the ink jet printer is a thermal ink jet printer and the droplets are caused to be ejected by heating the ink and causing bubbles to from therein.

14. A process according to claim 13 wherein x and y are each independently a number of from about 100 to about 200.

15. A process according to claim 13 wherein the polymeric additives is present in an amount of from about 0.0001 percent by weight to about 1 percent by weight.

16. A process according to claim 13 wherein the polymeric additive is present in an amount of from about 0.0001 percent by weight to about 0.5 percent by weight.

17. A process according to claim 13 wherein the polymeric additive is of the formula

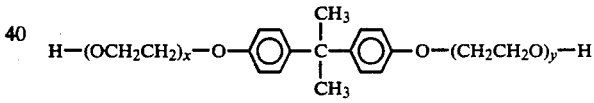

wherein x and y are each independently a number of from about 100 to about 400.

18. A process according to claim 13 wherein the polymeric additives has a molecular weight of from about 14,000 to about 22,000.

19. A process according to claim 13 wherein the viscosity of the ink is from about 1 to about 5 centipoise.

20. A process according to claim 13 wherein the aqueous liquid vehicle comprises water and cyclohexyl pyrrolidone.

* * * * *